Patented Aug. 14, 1945

2,382,472

UNITED STATES PATENT OFFICE 2,382,472

REGENERATION OF CATALYSTS

Frederick E. Frey, Bartlesville, Okla., assignor to Phillips Petroleum Company, a corporation of Delaware No Drawing. Application March 18, 1941,
Serial No. 384,027

9 Claims. (Cl. 252—242)

This invention relates to a process for the regeneration of solid catalytic materials. It relates more specifically to the regeneration of silica-alumina type catalysts which have been used in chemical reactions, such as transformation or other treatment of organic materials including cracking, isomerization, polymerization, and depolymerization of hydrocarbons and their derivatives, hydrolysis of alkyl and aryl halides at elevated temperatures, addition of certain halogens and hydrogen halides to unsaturated compounds, and splitting out hydrogen halide from an alkyl halide.

After a period of use in catalyzed reactions which involve hydrocarbons and/or their derivatives, the activity of the catalyst becomes greatly decreased, an effect which accompanies the deposition of tar and other carbonaceous material on the surface and within the pores of the catalytic material. In order to restore the catalyst to an active state, the deposited material must be removed, and this removal must be accomplished in such a way as not to decrease appreciably the activity inherent in the catalytic material.

The removal may be effected in some instances, especially in the first operations, by washing with a substance, such as benzene, which serves as a solvent for the tarry deposits. These washing operations serve for a time to restore appreciable activity to the catalytic material, but the efficiency of the conversion decreases as the amount of the deposit of carbonaceous material increases and becomes of a character more difficult to remove, particularly that of the nature of free carbon. Other methods than the solvent-washing must be employed to remove such carbonaceous material, and oxidation at more or less elevated temperatures, or burning out, is in general a satisfactory procedure.

In regenerative processes in which oxygen or an oxygen-containing gas is used to burn the carbonaceous deposit, the temperatures ordinarily used are generally such that severe damage may be done to the catalytic materials; for example, temperatures above about 1050° F. practically completely destroy certain activities of silica-alumina type catalysts, apparently converting them into less active aluminum-silicate forms, and temperatures above about 950° F. decrease the activity of the catalysts to such an extent as to make regeneration by burning-out at these temperatures unfeasible. Undesirably high temperatures lead to partial loss of catalytic activity and, where high activity and repeated regeneration are desired, any reduction or prevention of this loss in activity has considerable importance.

I have now found that I can carry out suitable regenerations of silica-alumina type catalysts at temperatures sufficiently lower than conditions of usual regenerative processes as to decrease markedly the extent of loss in activity of the catalytic materials and that the final or highest temperatures required for carrying out regenerative processes may be decreased by starting out the process at a low temperature in an atmosphere with a low absolute pressure of free or reactive oxygen and progressively increasing the absolute pressure of the oxygen used in the burning-out procedure.

The object of the present invention is a process for regeneration of solid, granular catalytic materials by burning-out under controlled conditions.

A further object is to remove carbonaceous material from solid deactivated silica-alumina type catalyst by oxidation without adversely affecting the catalyst to any considerable extent.

Another object is to effect regeneration of catalytic materials at low temperatures.

Still another object is to regenerate synthetic gel catalysts.

Another object is a process for regeneration or revivification of silica-alumina catalysts.

Other objects and advantages of my invention will become apparent to those skilled in the art as the disclosure and discussion proceed.

This invention is particularly suitable for the regeneration of silica-alumina type catalysts, which are heat-sensitive as pointed out above, when they have been deactivated and are covered by a deposition of carbonaceous materials. A silica alumina catalyst, insofar as this disclosure and specification is concerned, refers to a catalyst which comprises a major portion of silica and a minor portion, not more than 10 per cent and generally between 0.5 and 5 per cent by weight, of aluminum in the form of alumina. In the preparation of the preferred form of such a catalyst, an acid silica hydrogel is first prepared, and before it is thoroughly dried or dehydrated it is treated or activated with an aqueous solution of an aluminum salt, such as a solution of aluminum chloride, sulfate or nitrate. In this manner, a part of the aluminum from the solution is selectively adsorbed by the hydrous silica, presumably in the form of a hydrous oxide or loose hydroxide compound, and it is not removed by subsequent washing. This selective absorption is attested by a decrease in the aluminum content of the activating solution as well as a decrease in the pH of the solution as the activation progresses. After activation, the material is washed until the wash water is substantially free of the anion of the salt of the activating solution, and it is then dried.

The resultant material presumably comprises an intimate association of alumina on the surface of the silica, and it appears to be different from any aluminum silicates prepared in a basic medium, or from catalysts prepared by the formation of alumina on well dried silica by thermal decomposition of aluminum nitrate deposited on such dried silica.

Various catalysts, of this nature but differing among themselves as to one or more specific properties, may be prepared by activating a hydrous silica gel with an aqueous solution of a hydrolyzable salt of some other metal, especially one selected from group III B or from group IV A of the periodic system, instead of with a solution of an aluminum salt. More particularly a salt of indium, thallium, titanium, zirconium, beryllium or thorium may be used to activate the silica gel and, thereby, to prepare catalysts of this same general type. Boron, in the form of boric acid or a soluble borate such as sodium borate, may also be incorporated with a silica gel of a suitable pH to form a silica boron oxide catalyst. Such catalytic materials, comprising silica and various metal oxides, are known to the art.

All these catalysts in general can be termed synthetic gel catalysts, and in particular will be referred to as "silica-alumina type" catalysts. They have been found quite useful in processes which involve transformation or other treatment of hydrocarbons and their derivatives, as hereinbefore discussed. In many of the processes for which such catalysts have been found useful, side reactions take place which result in accumulation of carbonaceous deposits on the catalyst particles of various and varying compositions, from heavy oils and tars to very hydrogen-poor materials. Such accumulations are deleterious and are accompanied by decreases in catalytic activities. Removal of these carbonaceous deposits by burning out has often, in the past given a product which had little or no catalytic activity for the conversion of hydrocarbons. By following the present process, the carbonaceous material is removed with a negligible or much less loss of activity, and at times with an actual increase in activity.

As just mentioned, the carbonaceous material deposited on the catalyst is a composite of various hydrogen-carbon compounds, which I have found are attacked by free oxygen under widely different conditions. Thus, if only mild conditions are employed, the less reactive deposits remain substantially unaffected, but under adiabatic, or semiadiabatic, conditions such as are present in large catalyst bodies especially if located in insulated catalyst chambers, the heat developed in the removal of the more reactive deposits will often render the conditions sufficiently more drastic that the less reactive material present is also affected. This effect appears especially in certain regions or large catalyst masses, developing what are known as "hot spots," which when once formed tend to spread rapidly and beyond control to the detriment of the major part of the catalyst mass. I have found it necessary to control carefully the regeneration conditions in the initial part of the process, so that only the more reactive material is more or less selectively removed without initiating removal of less reactive material and I have also found that after the removal of the more reactive material this less reactive material can be satisfactorily removed by a carefully controlled and progressively increased concentration of reactive oxygen.

In regeneration of a deactivated carbonized silica-alumina type catalyst, according to one modification of my invention, the operation may be begun by supplying a gas, comprising about 1 to 10 per cent oxygen at about atmospheric pressure, or in other words supplying a gas with an absolute pressure of about 0.15 to 1.5 pounds per square inch of free oxygen, at an initial temperature not greater than about 550° F. In the actual practice of my invention, the gaseous regenerating medium passed to the bed of deactivated catalyst in this initial part of the regeneration is generally formed by mixing with flue gas, or spent combustion gas, a suitable portion of air, or by using a suitable amount of excess air in making flue gas, in order to arrive at a suitable content of free oxygen. In some cases air may be added to the effluent of the regeneration, which is in part recycled. Such gases may need to be dehydrated, as disclosed in the copending application Serial No. 383,234, filed March 13, 1941, of which I am a coinventor. The burning out is accompanied by a production of carbon dioxide, and the oxygen partial pressure and temperature should be so correlated that the effluent gas does not contain more than about 2.5 per cent of such carbon dioxide, preferably less than about 1.5 per cent. When an appreciable amount of carbon monoxide is formed, the total carbon oxide content may be somewhat higher and in general the production of 1.6 per cent of carbon monoxide will correspond to, or is to be considered the equivalent of, about 1.0 per cent of carbon dioxide. As regeneration proceeds at a more or less constant temperature level, the $CO_2$ produced by the regeneration begins to decrease, although much carbonaceous material may be left on the catalyst. With this decrease in the rate of reaction, the temperature may be increased—at such a rate that the $CO_2$ content of the effluent gas does not increase too rapidly and such that "hot spots" do not develop. The net increase in $CO_2$ content of exit gas over the inlet gas should still be held at a maximum of about 2.5 per cent and should be preferably between about 0.1 and 1.5 per cent—until the maximum regeneration temperature is reached, which should be below about 950° F. and preferably not greater than between about 650 and 750° F. When such a procedure as outlined above is followed, it will be necessary to follow and control the process by controlling the increase in $CO_2$ content of the gases as determined by suitable analysis, rather than the absolute $CO_2$ content of the effluent gases alone. Such a control of the burning off process to produce only a limited maximum amount of $CO_2$ in the effluent gas is a part of my invention. The temperature of the catalyst mass may be followed by thermocouples or the like embedded therein. While maintaining such a reaction temperature, the oxygen content of the incoming gas is increased gradually, as by the use of less and less flue gas diluent until the gas comprises about 20 per cent oxygen—or a partial pressure of about 3 pounds per square inch—which corresponds more or less to the use of undiluted air. While the oxygen-content of the inlet gas is being increased up to this point, the absolute pressure is maintained more or less constant and only a little above atmospheric at most, and the composition of the gas is changed at such a rate that the $CO_2$ produced by the reaction remains more or less constant, and does not exceed in amount a net increase within the range previously indicated. During these changes, the absolute pressure of oxygen has been increased from about 0.15 to 3 pounds per square inch.

At this point, the oxygen pressure is increased still further, while still maintaining the temperature of the catalyst mass below a deleterious level. This is done conveniently by using undiluted air and increasing the total pressure of the in-coming gases. It is preferable, with the initial increase in pressure, to decrease the temperature to some extent in order to inhibit or prevent undue rise in the reaction rate or increase of the carbon dioxide content of the effluent, with this increased pressure. As the $CO_2$-content of the effluent gas again begins to decrease, the pressure should be increased progressively until a final pressure about 1250 to 2500 pounds per square inch, which corresponds to 250 to 500 pounds per square inch of oxygen pressure, is reached. Near the latter part of this treatment the temperature may be allowed to increase to the beforementioned maximum.

It may be desirable near the end of the regeneration process, when the amount of carbonaceous material remaining is small and quite resistant to attack by free oxygen, and will not tend to cause evolution of large quantities of heat or development of "hot spots", to use higher concentrations of oxygen, or even pure oxygen at pressures between about 250 and 500 pounds per square inch for the burning-out process. The regeneration of the catalyst may be considered complete when the $CO_2$-content of the effluent gas, under burning-out conditions which correspond to about 250 to 500 pounds per square inch oxygen pressure and a temperature of about 750 to 950° F., has become practically negligible. If a carbon dioxide-free gas is not being used in the oxidation, the end-point of the regeneration is determined by comparison of the $CO_2$-content of the inlet and exit gases.

Although at all times it is necessary to control the temperature of the catalyst bed and the oxygen pressure so that the $CO_2$-content of the effluent does not become too great, the maximum permissible $CO_2$-content is generally greater in the initial stages than in the latter stages. Thus, with the burning-out temperature not greater than between about 500 and 650° F., and a partial pressure of oxygen not greater than about 1.0 to 1.5 pounds per square inch, the maximum of 2.5 per cent net content of $CO_2$ in the effluent may be closely approached. In subsequent stages of the process with a higher temperature and/or a higher partial pressure of oxygen, the net content of $CO_2$ in the effluent should preferably be held below 1.5 per cent.

It has been found also that, while concentrations of water vapor up to a value corresponding to about 1 to 1.5 pounds per square inch pressure do not cause too great an effect upon the activity of silica-alumina type catalysts and may even be advantageous, concentrations of water vapor in excess of about 1.5 pounds per square inch pressure in the presence of the catalyst at elevated temperatures are deleterious and impair the activity of the catalyst greatly. It is necessary, therefore, in the regenerative process to maintain the concentration of water vapor in the atmosphere surrounding a particularly water sensitive catalyst below the value corresponding to partial pressure of about 1.5 pounds per square inch, as discussed in the hereinbefore mentioned copending application Serial No. 383,234. Hence, the rate of flow of the incoming-gas, or the amount per pass, must be high enough to maintain the low concentration of water vapor. It may be desirable, and in some cases necessary, to subject the gas to a pre-drying treatment before using it in the regeneration process. This may be done by adequate cooling, the use of adsorbents such as charcoal or bauxite, the use of agents such as calcium chloride, or the like.

In order to prevent any injurious effect or loss of activity through contact with water vapor, the catalyst may be subjected to an initial dehydration before its first use. If the dehydration is effected by heat-treatment alone, the process must be carried out slowly and large volumes of dry air or other gas passed over the catalyst mass to remove the water vapor. Dehydration in vacuum at elevated temperatures gives the catalyst superior resistance to the deteriorating effects of long exposure at high temperatures. Complete absence or extremely low concentrations of water vapor are not imperative and a little rehydration, after severe dehydration, is permissible and may be beneficial. Dehydration, with removal of water evolved, up to the maximum temperature to which water-sensitive catalysts are to be exposed gives the catalysts considerable resistance to loss of activity at high temperatures.

High pressures and/or high concentrations of oxygen may be used throughout the regenerative process when the amount and/or nature of the carbonaceous deposit is such that control of the temperature or rate of reaction, within limits which would not cause damage to the catalytic material as herein described, is possible or when the nature of the catalytic material is such as not to require close temperature-control. At high pressures, with low concentration of oxygen, larger volumes of diluent gas are available for absorption of the heat liberated during the regeneration and, at high oxygen-concentrations, increased rate of burning is possible; either of the above conditions or intermediate combinations thereof permit increased burning-rate and shorter time for the regenerative process. In most cases, however, the use of relatively low pressures at the initiation of the regeneration gives satisfactory results.

As methods of satisfactorily applying my invention, the following examples, relating to silica-alumina-type catalysts, are presented.

Example I

A silica-alumina catalyst which had been used in polymerization of gaseous olefins to form polymers in the motor fuel range for 355 hours was subjected to a regenerative process in an atmosphere comprising oxygen under conditions where the rate of combustion—as temperature, pressure and oxygen-concentration were increased—was controlled with reference to the $CO_2$ concentration in the effluent gas. A summary of the operating conditions by which the activity of the catalyst was restored are presented in Table I.

Table I

| Time, hours (cumulative) | Temperature, °F. | Total pressure | Flow rate, vol. gas/vol. cat./hr. | Inlet gas, per cent oxygen by volume | Partial pressure of oxygen, lb./sq. in. absolute | Effluent gas Volume per cent oxygen | Effluent gas Volume per cent carbon dioxide |
|---|---|---|---|---|---|---|---|
| 0-5 | 350-550 | Atmospheric | 90:1 | 3 | 0.45 | | |
| 5-15 | 550-575 | ---do--- | 90:1 | 3 | 0.45 | 0.5-2.0 | 0.4-0.6 |
| 15-31 | 575-625 | ---do--- | 90:1 | 3 | 0.45 | 1.9-2.4 | 0.3-0.6 |
| 31-38 | 625-700 | ---do--- | 250:1 | 3 | 0.45 | 2.5-2.7 | 0.1-0.3 |
| 38-41 | 700 | ---do--- | 90:1 | 3 | 0.45 | 1.9-2.3 | 0.6 |
| 41-44 | 700 | ---do--- | 90:1 | 3 | 0.45 | 2.3-2.6 | 0.3-0.6 |
| 44-64 | 700 | Atm.-150 lb | 90:1 | 3 | 0.45-4.5 | 2.0-2.5 | 0.4-1.0 |
| 64-74 | 700 | 150-700 lb | 250:1 | 3 | 4.5-21 | 2.6-2.8 | 0.1-0.4 |
| 74-83 | 700 | 1,750-1,800 lb | 250:1 | 3 | 52.5-54 | 1.9-2.2 | 0.1-0.4 |
| 83-89 | 700 | Atm.-435 lb | 90:1 | 100 | 15-435 | | 0.1-0.4 |
| 89-106 | 700 | 415 | 90:1 | 100 | 415 | | 0.3-0.5 |
| 106-119 | 700 | 415 | 90:1 | 100 | 415 | | 0.4-0.05 |

Example II

Another silica-alumina catalyst which had been spent in polymerization of olefin was subjected to a similar regenerative process for 10 hours at temperatures progressing from an initial temperature of 525 to about 700° F. as a maximum temperature. A gas mixture comprising 9 per cent oxygen was used during the first 6 hours and the pressure was increased gradually from atmospheric to 1450 pounds per square inch, or a final absolute pressure of free oxygen of about 130 pounds per square inch; undiluted oxygen was used during the remainder of the treatment and the pressure was increased from atmospheric to a maximum of 430 pounds per square inch. The flow-rate of the inlet gas was 650-800 volumes of gas per volume of catalyst per hour, and the effluent gas showed a maximum of 1.8 per cent $CO_2$. A standard activity test on the regenerated catalyst indicated that 67 per cent of the initial activity had been restored.

Many modifications of my invention are possible and can be applied without going outside the spirit of the invention, which is not to be necessarily nor unduly restricted by the examples, and the optimum operating conditions for any particular case as may be readily determined by trial in the light of the disclosure.

I claim:

1. The process for the regeneration of carbonized silica-alumina type catalysts by burning-out in presence of a gas containing free oxygen, which comprises treating such a catalyst at a suitable temperature initially not greater than 550° F. with a gas of low free oxygen-concentration at about atmospheric pressure, progressively increasing the concentration of oxygen to about 20 per cent and increasing the total pressure on the gas mixture to the range of 1250 to 2500 pounds per square inch, regulating throughout the regeneration the rate of change of oxygen concentration and of pressure so as to maintain the $CO_2$ concentration of the effluent gas below a value corresponding to a net increase of about 2.5 per cent over the $CO_2$ concentration of the inlet gas, and progressively during said increasing step raising the temperature to a maximum not greater than about 950° F.

2. The process for the regeneration of a deactivated silica-alumina catalyst by burning-out in presence of a gas containing free oxygen, which comprises supplying a gas containing free oxygen at a low partial pressure while the total gas pressure is being increased from atmospheric to about 2500 pounds per square inch and the temperature is increased progressively to a maximum in the range of 650-750° F., regulating the increase in oxygen partial pressure and in temperature so as to maintain the $CO_2$ concentration of the effluent gas below a value corresponding to a net increase of about 1.5 per cent over the concentration of the inlet gas, and finally burning-out in the presence of oxygen under a partial pressure of about 250 pounds per square inch at a temperature within the range of 650 to 750° F.

3. A process for removing a carbonaceous deposit from a deactivated silica-alumina type catalyst, which comprises treating said catalyst with a gas containing free oxygen, in an amount initially not greater than that sufficient to establish an absolute pressure of free oxygen of about 0.5 pound per square inch, at an elevated temperature initially not greater than about 550° F. and such that said carbonaceous deposit and said oxygen react to produce carbon dioxide in an amount not greater than about 2.5 per cent by volume in the effluent gas, progressively increasing the temperature of said treatment to a maximum of about 950° F. and the absolute partial pressure of free oxygen to a maximum of at least about 250 pounds per square inch, and correlating said increases of temperature and oxygen pressure to maintain the production of carbon dioxide substantially constant throughout the range of increasing temperature.

4. A process for reactivating a catalyst of the type used in the conversion low boiling olefins to higher boiling hydrocarbons which has become carbonized thereby comprising in combination the steps of removing said carbonization by contacting said catalyst at an oxidizing temperature not in excess of about 550° F. with a regenerative gas containing free oxygen in an amount such that the carbon dioxide produced by said oxidizing is present in the effluent gas in a concentration not greater than about 2.5 per cent by volume, progressively increasing said temperature to a maximum not greater than about 750° F. and progressively increasing the partial pressure of free oxygen to a maximum of at least 250 pounds per square inch and in a manner such that the carbon dioxide produced does not exceed 2.5 per cent of the effluent gas.

5. A process for removing a carbonaceous deposit from a deactivated silica-alumina catalyst, which comprises treating a mass of said catalyst with a gas initially at substantially atmospheric pressure containing free oxygen to an extent not greater than about 0.5 pound per square inch partial pressure at a temperature not greater than about 550° F. and such that said carbonaceous deposit and said free oxygen react to produce carbon dioxide in an amount not greater than about 2.5 per cent by volume in the effluent gas, progressively increasing the temperature of said mass of catalyst to a maximum not greater than about 750° F., progressively increasing the oxygen partial pressure to a value of at least about 250 pounds per square inch, and continuously during said increases maintaining the content of carbon dioxide of the effluent gas at a value below 2.5 per cent by volume.

6. In a process for removing a carbonaceous deposit from a deactivated silica-alumina type catalyst, the steps which comprise in combination initially treating a mass of said catalyst with a gas at substantially atmospheric pressure containing free oxygen to an extent not greater than about 0.5 pound per square inch partial pressure at an elevated temperature initially not greater than about 550° F. and such that said carbonaceous deposit and said free oxygen react to produce carbon dioxide in an amount initially not greater than about 2.5 per cent by volume in the effluent gas, progressively increasing the temperature of said mass of catalyst to a maximum not greater than about 750° F., progressively increasing the oxygen partial pressure of said gas to a value corresponding to undiluted air, maintaining during said increases substantially atmospheric pressure on said gas, correlating said temperature increase and said oxygen partial pressure to maintain said carbon dioxide concentration initially below 2.5 per cent and finally below 1.5 per cent, and subsequently increasing said oxygen partial pressure of said gas to a value of at least 250 pounds per square inch while maintaining the temperature of said catalyst mass at a temperature not greater than 750° F. and said carbon dioxide concentration not greater than 1.5 per cent.

7. A process for removing a carbonaceous deposit from a deactivated synthetic gel catalyst, which comprises treating such a deactivated catalytic material with a gas containing free oxygen, in an amount initially not greater than that sufficient to establish an absolute pressure of free oxygen of about 0.5 pound per square inch, at a regenerating temperature substantially below 950° F. and such that said carbonaceous deposit and said oxygen react to produce carbon dioxide, increasing the temperature of said treatment to a maximum of about 950° F. and the absolute partial pressure of free oxygen to at least about 250 pounds per square inch, and controlling and correlating said temperature and oxygen pressure to establish and maintain a production of carbon dioxide substantially constant throughout the range of increasing temperature, and continuing said treatment until said carbonaceous deposit is substantially removed.

8. A process for removing a carbonaceous deposit from a deactivated synthetic gel catalyst, which comprises treating such a deactivated catalytic material with a gas containing free oxygen, in an amount initially not greater than that sufficient to establish an absolute pressure of free oxygen of about 0.5 pound per square inch, at a regenerating temperature substantially below 950° F. and such that said carbonaceous deposit and said oxygen react to produce carbon dioxide, increasing the temperature of said treatment to a maximum of about 950° F. and the absolute partial pressure of free oxygen to at least about 250 pounds per square inch, and controlling and correlating said temperature and oxygen pressure to establish and maintain a substantially constant rate of production of carbon dioxide in an amount not greater than about 2.5 per cent by volume in the effluent gas, maintaining also the partial pressure of water vapor in the gas in contact with said catalyst not greater than about 1.5 pounds per square inch, and continuing said treatment until said carbonaceous deposit is substantially removed.

9. A process for reactivating a catalyst of the type used in the conversion low boiling olefins to higher boiling hydrocarbons which has become carbonized thereby comprising in combination the steps of regenerating said inactive catalyst by passing thereover a gas containing from 1 to 10 per cent free oxygen at an initial partial pressure of from 0.15 to 1.5 pounds per square inch, the initial total pressure being substantially atmospheric, the flow rate, oxygen content and temperature of said gas being such that the initial temperature of burning does not exceed 550° F., progressively adjusting the conditions of regeneration in such manner that the temperature of burning progressively rises to a maximum of about 700° F. by gradually increasing the partial pressure of free oxygen in said gas from said initial figure to a figure of from about 50 to about 150 pounds per square inch by increasing the total pressure of said gas while holding the oxygen content of said gas substantially constant, discontinuing passage of said gas and initiating passage of substantially pure oxygen at an initial pressure of substantially atmospheric, progressively increasing the pressure of said pure oxygen to a maximum between about 250 and 500 pounds per square inch while holding the temperature of burning at substantially 700° F. and continuing regeneration thus until the carbonaceous deposit is removed, the amount of carbon dioxide formed during the foregoing steps by combination of the carbonaceous deposit with oxygen at no time exceeding 2.5% by volume of the effluent gas.

FREDERICK E. FREY.